United States Patent [19]

Cullen

[11] Patent Number: 4,748,069
[45] Date of Patent: May 31, 1988

[54] LIQUID ABSORBING AND IMMOBILIZING PACKET AND PAPER THEREFOR

[75] Inventor: John S. Cullen, Buffalo, N.Y.

[73] Assignee: Multiform Desiccants, Inc., Buffalo, N.Y.

[21] Appl. No.: 877,095

[22] Filed: Jun. 20, 1986

[51] Int. Cl.[4] .......................... B05D 3/02; B05D 1/14; B65D 81/26; B65D 85/14

[52] U.S. Cl. ...................................... 428/195; 428/35; 428/76; 428/200; 428/201; 428/211; 206/204; 206/524.7; 426/124

[58] Field of Search .................. 428/35, 76, 200, 201, 428/210, 147, 195; 206/204, 524.7; 426/124

[56] References Cited

U.S. PATENT DOCUMENTS

| | | | |
|---|---|---|---|
| 2,283,867 | 5/1942 | Flasdorf et al. | 206/204 |
| 3,990,872 | 11/1976 | Cullen | 55/274 |
| 4,124,116 | 11/1978 | McCabe, Jr. | 206/204 |
| 4,603,069 | 7/1986 | Haq et al. | 428/76 |
| 4,615,923 | 10/1986 | Marx | 428/35 |

FOREIGN PATENT DOCUMENTS

| | | | |
|---|---|---|---|
| 1362935 | 7/1962 | France | 206/524.7 |
| 711186 | 6/1954 | United Kingdom | 204/ |

*Primary Examiner*—John E. Kittle
*Assistant Examiner*—Patrick J. Ryan
*Attorney, Agent, or Firm*—Joseph P. Gastel

[57] ABSTRACT

A packet for absorbing and immobilizing a liquid including an envelope which is degradable in the liquid and a liquid absorbing and immobilizing material in the envelope. The envelope has a dot matrix coating of heat-fusible material on degradable starch paper. The dot matrix coating permits heat-sealing of the envelope having the uncoated portions of the starch paper to degrade in solutions in which the dot matrix coating is insoluble. A paper product including a paper which is degradable in liquid and a dot matrix pattern of material on the paper for causing portions of the paper to adhere to each other.

22 Claims, 1 Drawing Sheet

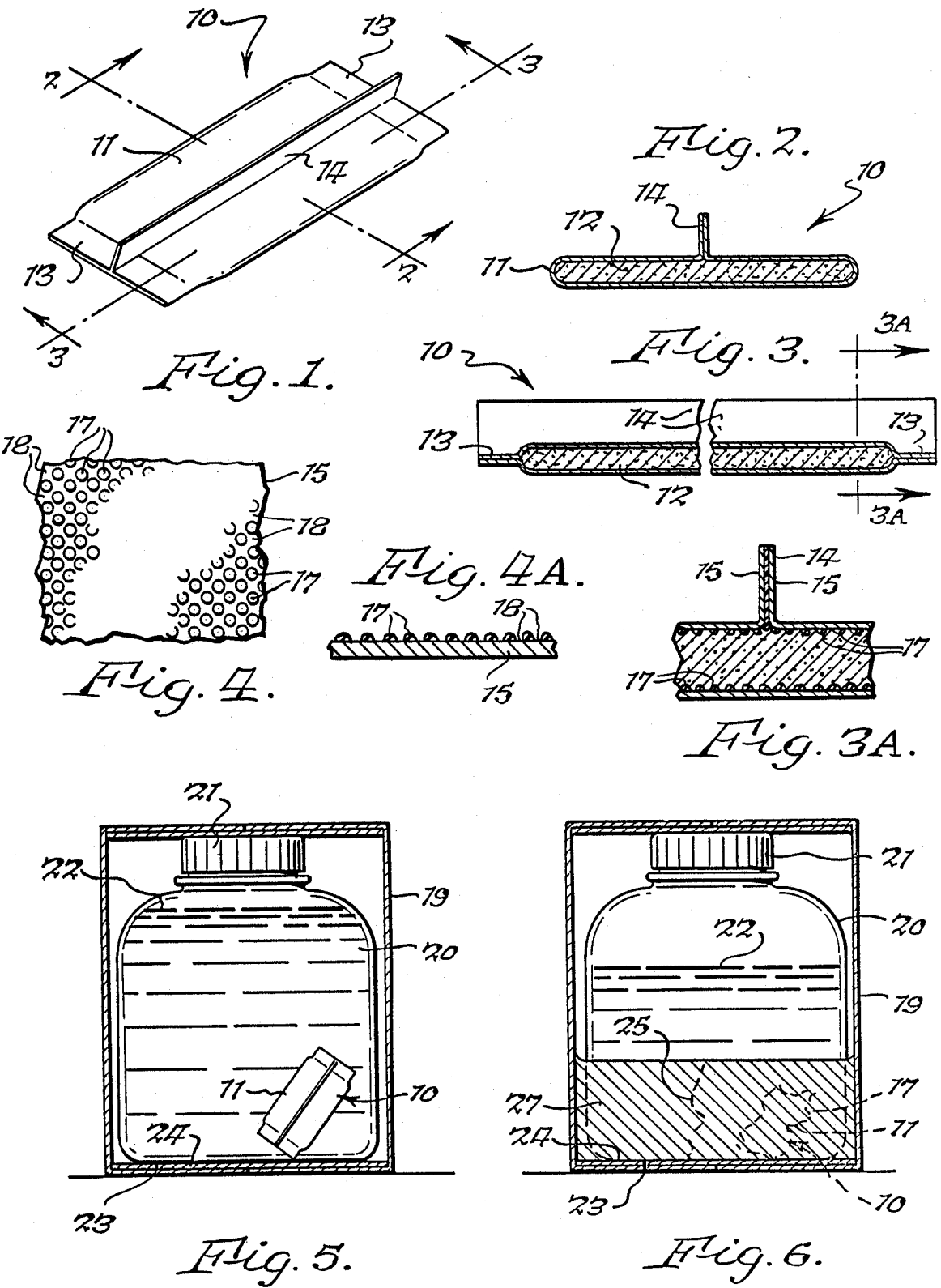

LIQUID ABSORBING AND IMMOBILIZING PACKET AND PAPER THEREFOR

BACKGROUND OF THE INVENTION

The present invention relates to an improved packet of material for absorbing and immobilizing liquid after the liquid comes in contact therewith and to the paper used for such an envelope.

By way of background, the liquid absorbing and immobilizing character of sodium polyacrylate is known. A small amount of this material will absorb and immobilize a relatively large quantity of an aqueous solution by forming a gel-like material when it reacts therewith. In copending application Ser. No. 863,722, filed May 16, 1986, a packet is disclosed which contains sodium polyacrylate in a starch paper envelope which is coated with polyvinyl acetate for heat-sealing the envelope. However, in one embodiment the polyvinyl acetate was coated uniformly on the starch paper, and thus the envelope would not disintegrate in solutions in which the polyvinyl acetate was not soluble.

SUMMARY OF THE INVENTION

It is the object of the present invention to provide an improved packet for absorbing and immobilizing liquids in which it may be immersed even though portions of the packet may not be soluble in the liquid.

Another object of the present invention is to provide an improved soluble paper which has a discontinuous coating thereon which is used to retain portions of the envelope in sealed relationship while permitting the remainder of the soluble paper to dissolve even if the discontinuous coating is insoluble in the liquid in which the soluble paper is immersed. Other objects and attendant advantages of the present invention readily will be perceived hereafter.

The present invention relates to a packet for absorbing and immobilizing a liquid comprising an envelope which is degradable in said liquid, and a liquid absorbing and immobilizing material in said envelope, said envelope including an outer layer of material which is degradable in said liquid, and an uniform discontinuous coating of material on said outer layer which permits said outer layer to be sealed in the form of said envelope while not obstructing uncoated portions of said outer layer.

The present invention also relates to a paper product comprising a paper which is degradable in liquid, and an uniform discontinuous coating of material on said paper for permitting portions of said paper to be sealed to each other.

The present invention also relates to a degradable envelope comprising an outer layer of degradable paper, an inner layer of an uniform discontinuous coating of material, and seams fabricated from lapped portions of said inner layer which are fused to each other by said discontinuous coating.

The present invention also relates to an absorbent packet in an outer container having an inner container with liquid from which said liquid can leak, said absorbent packet being located between said inner and outer containers for absorbing and immobilizing said liquid within said outer container in the event of leakage of said liquid from said inner container comprising an envelope which is degradable in said liquid, and a liquid absorbing and immobilizing material in said envelope, said envelope including an outer layer of material which is degradable in said liquid, and an uniform discontinuous coating of material on said outer layer which permits said outer layer to be sealed in the form of said envelope.

The various aspects of the present invention will be more fully understood when the following portions of the specification are read in conjunction with the accompanying drawings wherein:

BRIEF DESCRIPTION OF THE DRAWINGS

FIG. 1 is a perspective view of the absorbent packet of the present invention;

FIG. 2 is a cross sectional view taken substantially along line 2—2 of FIG. 1;

FIG. 3 is a fragmentary cross sectional view taken subtantially along line 3—3 of FIG. 1 with the dot matrix portion shown in disproportionate enlargement;

FIG. 3A is a fragmentary cross sectional view taken substantially along line 3A—3A of FIG. 3;

FIG. 4 is a greatly enlarged fragmentary plan view of the material of the envelope;

FIG. 4A is a fragmentary cross sectional view of the material which comprises the envelope;

FIG. 5 is a side elevational view, partially in cross section, showing an inner container of liquid located within an outer container with the degradable packet of absorbing and immobilizing material located therebetween while the inner container is intact; and FIG. 6 is a view similar to FIG. 5 but showing a rupture in the inner container and the liquid which leaked therefrom solidified after the degrading of the packet envelope.

DESCRIPTION OF THE PREFERRED EMBODIMENTS

The packet 10 for absorbing and immobilizing a liquid includes an envelope 11 of material which is degradable in the liquid and a liquid absorbing and immobilizing material 12 contained within envelope 11. The envelope 11 is formed of sheet material which is heat-sealed at end seams 13 and along a central seam 14. Preferably the sheet material from which envelope 11 is made includes a degradable starch paper 15 having a polyvinyl acetate uniform discontinuous coating 17 in a dot matrix pattern over its entire surface. The dot matrix pattern may have as many as 1,000 spaced dots per square inch, or any other suitable amount, with the spaces on the paper between the dots being uncoated.

When the envelope 11 is fabricated, the starch paper 15 is the outer layer and the dot matrix pattern of polyvinyl acetate is the inner layer. It is the polyvinyl acetate coating portions of envelope 11, when placed face-to-face which permits the seams 13 and 14 to be formed by heat-sealing, as depicted in FIG. 3A. While a dot matrix pattern has been disclosed in which the dots appear in the form of circles, it will be appreciated that any other suitable uniform discontinuous pattern is acceptable, provided it permits the starch paper to be adequately sealed. Furthermore, it will be appreciated that while seams 13 and 14 are formed by lapping the inner layer in face-to-face relationship, the seams, such as 14, may also be formed by lapping an inner surface to an outer surface.

In the present instance the degradable outer layer 15 of envelope 11 is a starch paper which is degradable in water and other liquids. A starch paper which has been used successfully is known under the trademark DIS- SOLVO and is a product of Gilbreth International Corporation, and it is obtainable in grades No. 2845 and No. 2800. It is a composition which includes between about 80–82% sodium carboxymethyl cellulose and about 18% wood pulp fiber and other trace materials such as calcium carbonate and titanium dioxide. However, the envelope may be of any other liquid-degradable material. The dot matrix pattern, or any other suitable discontinuous pattern, permits liquid, which may not otherwise be able to dissolve the material of coating 17, to completely degrade envelope 11 because there are uncoated spaces 18 between the dots of the coating 17 through which the liquid can pass. However, the special advantage of the dot matrix pattern is that the dots are extremely small so that even if they do not dissolve, the degraded envelope will be practically entirely disintegrated, whereas if the discontinuous pattern consisted of large areas of coating, complete disintegration might not be obtained even though the envelope itself was degraded.

The liquid absorbing and immobilizing material 12 is sodium polyacrylate having the formula $(C_3H_3O_2Na)_n$. It is obtainable under the trademark WATER LOCK J-550 from Grain Processing Corporation. This material is a free-flowing powder having the ability to absorb or immobilize large volumes of aqueous solutions including dilute alkalis, dilute acids and body fluids. The material 12 will absorb and immobilize 650 milliliters of water per gram of material or 75 milliliters of 1% sodium chloride solution per gram of material. The material 12 will perform the foregoing absorbing and immobilizing in about 25 seconds and added to this is the time which is required for the envelope 11 to degrade which is about another 30 seconds. Thus, when the packet 10 is immersed in liquids of the foregoing type, the absorbing and immobilizing process will take approximately one minute.

In FIGS. 5 and 6, one mode of operation of packet 10 is disclosed. In this instance, packet 10 is inserted into outer container 19, which may be of any suitable material, such as paper, cardboard, wood or plastic, and it is located outside of inner frangible container 20 which may be of any suitable material, such as glass, ceramic or plastic. Inner container 20 includes a cap 21 which holds the liquid 22 sealed within inner container 20. While packet 10 is shown located between the sides of containers 19 and 20, it is preferable that it be located between the bottom 23 of inner container 20 and the bottom 24 of outer container 19 so that if there is leakage, the envelope 11 will start to degrade at the earliest possible time. While outer container 19 is shown in cross section in FIGS. 5 and 6, it will be appreciated that it completely surrounds inner container 20 to the extent that it will tend to capture any liquid which leaks from the inner container.

If for any reason inner container 20 should rupture, as by a crack 25 (FIG. 6) so that liquid 22 will flow therethrough, the envelope 11 of packet 10 will start to degrade upon contact with the liquid. After it has degraded sufficiently, the material 12 will react with the liquid to absorb and immobilize it by forming a gel-like substance 27. In FIG. 6, the formation of the gel will act as a seal so that it will plug the crack 25, thereby causing a part of liquid 22 to be retained in its liquid form within container 20. If the container 20 broke to a greater extent, that is, more than a crack, so that all of the liquid 22 tended to flow therefrom, the entire amount of liquid would be formed into a gel-like substance, such as 27, provided that the outer container 19 could retain the liquid therein for a sufficient time for the envelope 11 to degrade and for the solidification to occur. In this respect, it is preferable that the outer container 19 be sufficiently leak-resistant so that the foregoing could occur.

It will be appreciated that the amount of material 12 which is required within envelope 11 for any particular situation will depend on the volume of inner container 20, that is, envelope 11 should contain enough material 12 to completely absorb and immobilize the entire amount of liquid.

While the material of envelope 11 has been shown as including a uniform continuous dot matrix coating 17 on its entire surface, it will be appreciated that in certain circumstances this dot matrix coating for effecting heat-sealing need be applied to only select portions of the material 15 which are to be sealed to each other. Furthermore, while the discontinuous coating 17 has been described as polyvinyl acetate, it will be appreciated that it can comprise any other material which will adhere to starch paper and which lends itself to heat-sealing or to other types of sealing during the formation of envelope 11.

While the present disclosure has been directed specially to an absorbing and immobilizing material which reacts with aqueous solutions, it will be appreciated that the principles of the present invention include the use of absorbing and immobilizing materials which operate with other liquids and the envelope may comprise materials other than starch paper which will degrade in such other solutions.

While a specific example has been shown in FIGS. 5 and 6, it will be appreciated that packets, such as 10, may be placed in contiguous relationship to a liquid-containing container which may not be enclosed within an outer container, to absorb and immobilize leaks therefrom, provided that leaking liquid can be restrained for a sufficient time for solidification to occur.

While preferred embodiments of the present invention have been disclosed, it will be appreciated that it is not limited thereto but may be otherwise embodied within the scope of the following claims.

What is claimed is:

1. A packet for absorbing and immobilizing a liquid comprising an envelope which is degradable in said liquid, and a liquid absorbing and immobilizing material in said envelope, said envelope including a layer of material which is degradable in said liquid, and a patterned coating of sealing material in said layer of material with uncoated portions of said layer of material within said patterned coating which can remain exposed to be contacted directly by and degraded by said liquid, said patterned coating of sealing material including portions which are sufficiently closely spaced to permit said layer of material to be sealed in the form of said envelope.

2. A packet as set forth in claim 1 wherein said a liquid absorbing and immobilizing material is sodium polyacrylate.

3. A packet as set forth in claim 1 wherein said layer of material is starch paper, and wherein said patterned coating of sealing material is polyvinyl acetate.

4. A packet as set forth in claim 1 wherein said patterned coating of sealing material is in a dot matrix pattern.

5. In an outer container having an inner container with liquid from which said liquid can leak, an absorbent packet located between said inner and outer containers for absorbing and immobilizing said liquid within said outer container in the event of leakage of said liquid from said inner container comprising an envelope which is degradable in said liquid, and a liquid absorbing and immobilizing material in said envelope, said envelope including a layer of material which is degradable in said liquid, and a patterned coating of sealing material on said layer of material with uncoated portions of said layer of material within said patterned coating which can remain exposed to be contacted directly by and degraded by said liquid, said patterned coating of sealing material including portions which are sufficiently closely spaced to permit said layer of material to be sealed in the form of said envelope.

6. In an outer container having an inner container with liquid from which said liquid can leak as set forth in claim 5 wherein said layer of material comprises starch paper, and wherein said patterned coating of sealing material comprises polyvinyl acetate.

7. In an outer container having an inner container with liquid from which said liquid can leak as set forth in claim 5 wherein said absorbing and immobilizing material is sodium polyacrylate.

8. In an outer container having an inner container with liquid from which said liquid can leak as set forth in claim 5 wherein said envelope has an inner surface and an outer surface, and wherein said layer of material comprises said outer surface of said envelope and wherein said patterned coating of sealing material is in a dot matrix pattern on said inner surface of said envelope.

9. A paper product comprising a degradable paper which is degradable in liquid, and a patterned coating of sealing material on said degradable paper with uncoated portions of said degradable paper within said patterned coating, said patterned coating of sealing material including portions which are sufficiently closely spaced to permit portions of said degradable paper having said patterned coating thereon to be sealed to other portions of said degradable paper while said patterned coating does not obstruct degradation of said uncoated portions of said degradable paper within said patterned coating.

10. A paper product as set forth in claim 9 wherein said patterned coating of sealing material is in a dot matrix pattern.

11. A paper product as set forth in claim 9 wherein said paper is starch paper.

12. A paper product as set forth in claim 11 wherein said patterned coating of sealing material is in a dot matrix pattern.

13. A paper product as set forth in claim 11 wherein said patterned coating of sealing material is polyvinyl acetate.

14. A paper product as set forth in claim 13 wherein said patterned coating of sealing material is in a dot matrix pattern.

15. A degradable envelope comprising a layer of degradable paper, a layer of a patterned coating of sealing material on said degradable paper with uncoating portions of said degradable paper within said patterned coating, said patterned coating including portions which are sufficiently closely spaced so as to cause seams to be formed when said portions of said degradable paper with said patterned coating thereon are lapped with other portions of said degradable paper and fused thereto, and seams fabricated from lapped portions of said degradable paper which are fused to each other by said patterned coating of sealing material.

16. A degradable envelope as set forth in claim 15 wherein said patterned coating of sealing material is in a dot matrix pattern.

17. A degradable envelope as set forth in claim 16 wherein said degradable paper is starch paper.

18. A degradable envelope as set forth in claim 15 wherein said lapped portions comprise portions of said layer of said patterned coating in face-to-face relationship.

19. A packet as set forth in claim 1 wherein said uncoated portions of said layer of material surround said sealing material of said patterned coating.

20. In an outer container having an inner container with liquid from which said liquid can leak as set forth in claim 5 wherein said uncoated portions of said layer of material surround said sealing material of said patterned coating.

21. A paper product as set forth in claim 9 wherein said uncoated portions of said layer of material surround said sealing material of said patterned coating.

22. A degradable envelope as set forth in claim 15 wherein said uncoated portions of said layer of material surround said sealing material of said patterned coating.

* * * * *

UNITED STATES PATENT AND TRADEMARK OFFICE
CERTIFICATE OF CORRECTION

PATENT NO. : 4,748,069

DATED : May 31, 1988

INVENTOR(S) : John S. Cullen

It is certified that error appears in the above-identified patent and that said Letters Patent is hereby corrected as shown below:

Column 4, line 58 (claim 2), after "said" cancel --a--.

Column 6, line 14 (claim 15), change "uncoating" to --uncoated--.

Signed and Sealed this

Eleventh Day of October, 1988

*Attest:*

DONALD J. QUIGG

*Attesting Officer*  *Commissioner of Patents and Trademarks*